(12) United States Patent
Proca et al.

(10) Patent No.: US 9,007,794 B2
(45) Date of Patent: Apr. 14, 2015

(54) CONTROL SYSTEM FOR A POWER SUPPLY HAVING A FIRST HALF-BRIDGE LEG AND A SECOND HALF-BRIDGE LEG

(75) Inventors: Amuliu Bogdan Proca, Columbus, OH (US); Philip Irwin, Dublin, OH (US)

(73) Assignee: Solidstate Controls, LLC, Columbus, OH (US)

( * ) Notice: Subject to any disclaimer, the term of this patent is extended or adjusted under 35 U.S.C. 154(b) by 227 days.

(21) Appl. No.: 13/587,480

(22) Filed: Aug. 16, 2012

(65) Prior Publication Data
US 2013/0044529 A1 Feb. 21, 2013

Related U.S. Application Data

(60) Provisional application No. 61/525,160, filed on Aug. 18, 2011.

(51) Int. Cl.
| | |
|---|---|
| H02M 7/537 | (2006.01) |
| H02M 3/335 | (2006.01) |
| H01F 19/04 | (2006.01) |
| H01F 27/26 | (2006.01) |
| H01F 27/28 | (2006.01) |
| H01F 27/30 | (2006.01) |
| H01F 27/08 | (2006.01) |

(52) U.S. Cl.
CPC .......... *H02M 3/335* (2013.01); *Y10T 29/49071* (2013.01); *H01F 19/04* (2013.01); *H01F 27/085* (2013.01); *H01F 27/263* (2013.01); *H01F 27/2866* (2013.01); *H01F 27/306* (2013.01); *Y02B 70/1433* (2013.01)

(58) Field of Classification Search
USPC ............... 363/132, 55, 56.01, 95, 97, 98, 131
See application file for complete search history.

(56) References Cited

U.S. PATENT DOCUMENTS

| | | | | |
|---|---|---|---|---|
| 6,031,749 | A * | 2/2000 | Covington et al. ............. | 363/98 |
| 6,876,159 | B1 * | 4/2005 | Wu et al. ......................... | 315/291 |
| 8,450,905 | B2 * | 5/2013 | Guidarelli et al. ............ | 310/317 |
| 2008/0112200 | A1 * | 5/2008 | Tan et al. ....................... | 363/101 |
| 2011/0273916 | A1 * | 11/2011 | Fujiwara et al. ................ | 363/71 |
| 2012/0069612 | A1 * | 3/2012 | Hasler ............................. | 363/71 |

* cited by examiner

*Primary Examiner* — Adolf Berhane
*Assistant Examiner* — Nusrat Quddus
(74) *Attorney, Agent, or Firm* — James R. Eley; Eley Law Firm Co, LPA

(57) ABSTRACT

A power supply control system for a power supply having a first half-bridge leg and a second half-bridge leg. In the control system, a first plurality of drive signals are configured to operate a half-bridge as a forward leg while a second plurality of drive signals are configured to operate a half-bridge as a backward leg. A switch element is intermediate the first and second plurality of drive signals and the first and the second half-bridge legs, the switch element being adapted to operate the first half-bridge as a forward leg and the second half-bridge as a backward leg in a first operating mode, the switch element being further adapted to operate the first half-bridge as a backward leg and the second half-bridge as a forward leg in a second operating mode.

17 Claims, 6 Drawing Sheets

CONTROL SYSTEM FOR A POWER SUPPLY HAVING A FIRST HALF-BRIDGE LEG AND A SECOND HALF-BRIDGE LEG

CROSS-REFERENCE TO RELATED APPLICATIONS

This application claims priority to U.S. provisional application 61/525,160, filed Aug. 18, 2011, the contents of which are hereby incorporated by reference.

FIELD

The present invention relates generally to a control system for use in power supply systems, such as uninterruptible power supplies, inverter power supplies and battery chargers.

BACKGROUND

An uninterruptible power supply (UPS) is an electrical apparatus that provides emergency power to a load when the input power source, typically the utility mains, fails. A UPS differs from an auxiliary or emergency power system or standby generator in that it will provide instantaneous or near-instantaneous protection from input power interruptions by means of one or more attached batteries and associated electronic circuitry. While not limited to protecting any particular type of equipment, a UPS is often used to protect computers, data centers, telecommunication equipment and other electrical equipment where an unexpected power disruption could cause injuries, fatalities, serious business disruption or data loss.

An inverter is an electrical device that converts direct current (DC) to alternating current (AC). The converted AC can be established at any desired voltage and frequency with the use of appropriate transformers, switching, and control circuits. Solid-state inverters have no moving parts and are used in a wide range of applications, from small switching power supplies in computers to large electric utility high-voltage direct current applications that transport bulk power. Inverters are commonly used to supply AC power to loads from DC power sources.

A battery charger is a device that is used to transfer energy into a secondary cell or a rechargeable battery by forcing an electric current through it. In some cases battery chargers are designed for high-efficiency conversion of incoming commercial AC mains power to DC power for charging large banks of station batteries, while supplying power to continuous DC loads such as inverters. Such battery chargers are often used in conjunction with UPS systems, as well as a standalone device for battery charging only applications.

Due their criticality, there is a continuing need to increase the efficiency and reliability of UPS systems, inverters and battery chargers.

SUMMARY

A power supply control system is disclosed according to an embodiment of the present invention. In one embodiment an inverter includes a pair of half-bridge legs, one leg operating as a forward leg and the other operating as a backward leg. The control system selectably reverses the operating characteristics of the legs in a predetermined manner such that the half-bridge functioning as the forward leg operates instead as the backward leg and the half-bridge leg functioning as the backward leg operates instead as the forward leg. Selection between forward and backward operation of the half-bridge legs is controlled by elements such as a timer, a random control signal generator, and temperature signals corresponding to the temperature of one or more of the components of the half-bridge legs.

An object of the present invention is a power supply control system for a power supply having a first half-bridge leg and a second half-bridge leg. In the control system, a first plurality of drive signals are configured to operate a half-bridge as a forward leg while a second plurality of drive signals are configured to operate a half-bridge as a backward leg. A switch element is intermediate the first and second plurality of drive signals and the first and the second half-bridge legs, the switch element being adapted to operate the first half-bridge as a forward leg and the second half-bridge as a backward leg in a first operating mode, the switch element being further adapted to operate the first half-bridge as a backward leg and the second half-bridge as a forward leg in a second operating mode.

BRIEF DESCRIPTION OF THE DRAWINGS

Further features of the inventive embodiments will become apparent to those skilled in the art to which the embodiments relate from reading the specification and claims with reference to the accompanying drawings, in which:

DETAILED DESCRIPTION

Figure 1:
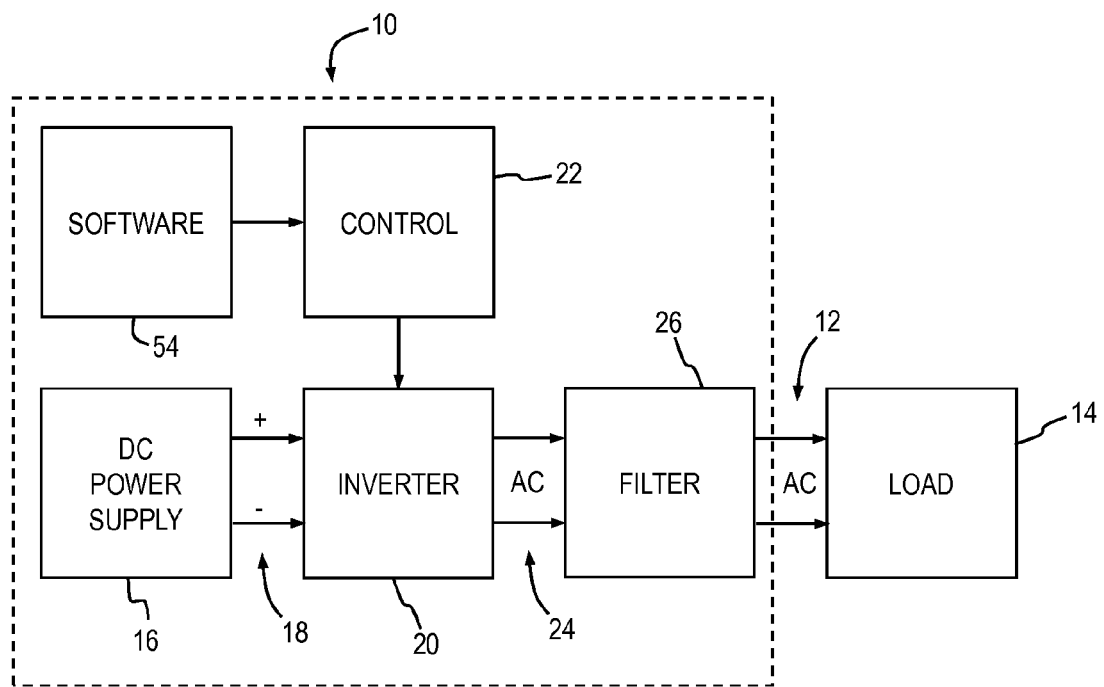
FIG. 1 is a block diagram of a system for balancing power losses in an inverter according to an embodiment of the present invention.

The general arrangement of an inverter system 10 is illustrated in FIG. 1 according to an embodiment of the present invention. System 10 develops AC power 12 for energizing one or more loads 14. A DC power supply 16 develops a DC voltage 18 at positive (+) and negative (−) terminals, which are in turn coupled to an inverter 20. Inverter 20 includes electrical switches which are operated by a control 22 to receive DC voltage 18 from DC power supply 16 and generate an AC output voltage 24. AC output voltage 24 is typically coupled through a filter 26, providing AC power 12 to load 14.

Figure 2:
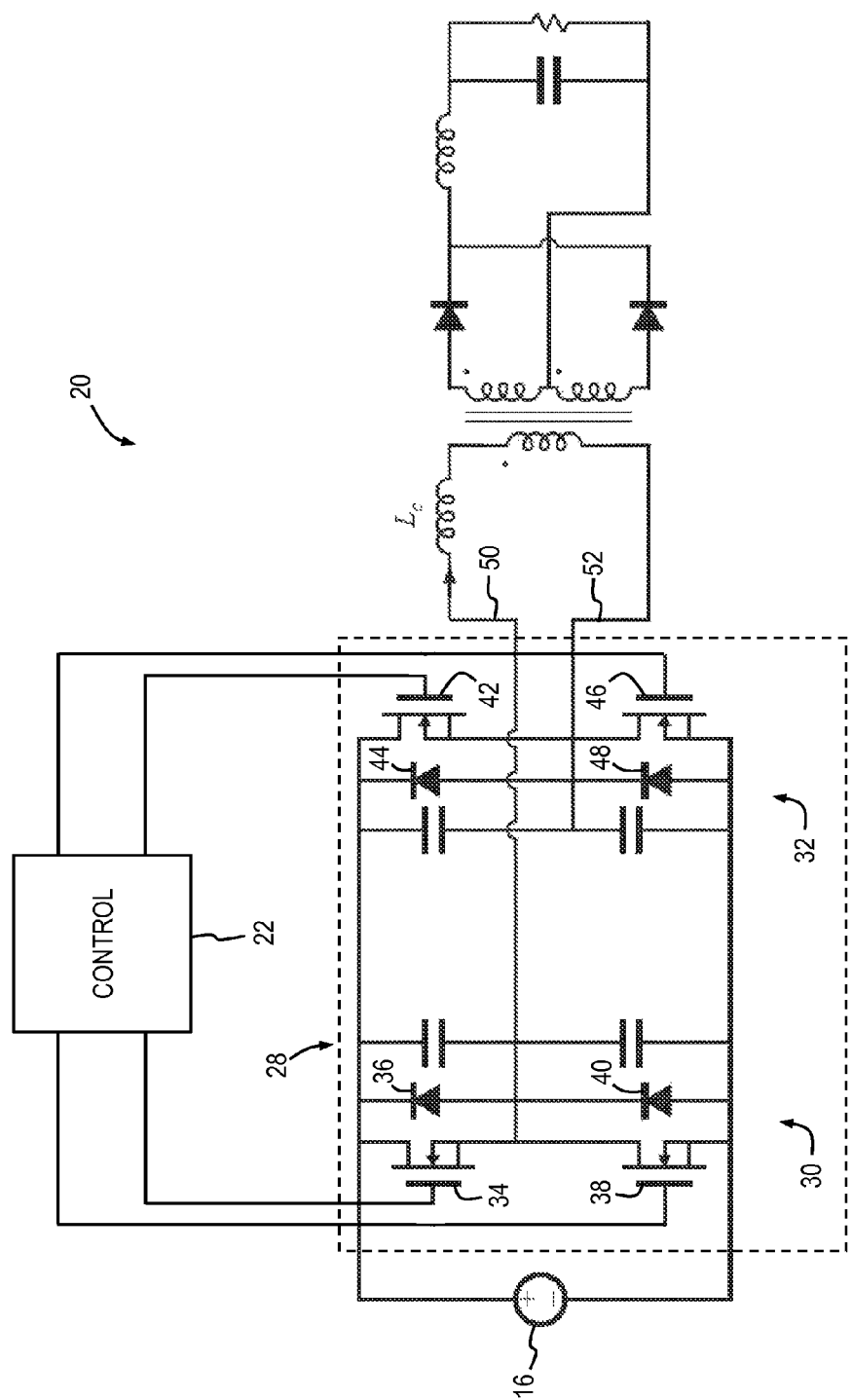
FIG. 2 is a schematic diagram showing details of an inverter portion of the block diagram of FIG. 1.

Inverters for converting DC power into AC power for energizing one or more loads typically include one or more inverter legs, each inverter leg in turn having a pair of controllable switches connected in series across the terminals of a DC power source. Referring to FIG. 2, inverter 20 includes at least one switching assembly 28 having a first leg 30 and a second leg 32.

First leg 30 includes a first switch 34 coupled to the (+) terminal of DC power supply 16. A first diode 36 is connected in an anti-parallel arrangement with first switch 34. A second switch 38 is connected to first switch 34 and to the (−) terminal of DC power supply 16, with a second diode 40 connected in an anti-parallel arrangement with the second switch. Switches 34, 38 of first leg 30 are thus configured in a half-bridge arrangement.

Similarly, second leg 32 includes a third switch 42 coupled to the (+) terminal of DC power supply 16. A third diode 44 is connected in an anti-parallel arrangement with third switch 42. A fourth switch 46 is connected to third switch 42 and to the (−) terminal of DC power supply 16, with a fourth diode 48 connected in an anti-parallel arrangement with the fourth switch. Switches 42, 46 of second leg 32 are thus configured in a half-bridge arrangement.

Switches 34, 38, 42 and 46 are operated by control 22 to switch between electrically conducting states (i.e., "ON") and non-electrically conducting states (i.e., "OFF") using pulse width modulation (PWM) to generate an AC output voltage at a pair of output terminals 50, 52.

Switches 34, 38, 42 and 46 may be any suitable device including, without limitation, bipolar junction transistors (BJTs), metal oxide semiconductor field effect transistors (MOSFETs) and insulated-gate bipolar transistors (IGBTs). Diodes 36, 40, 44 and 48 may be any type of diode having suitable voltage and current ratings. In some configurations diodes 36, 40, 44 and 48 may be integral to switches 34, 38, 42 and 46 respectively.

When inverter 20 is configured as a quasi-resonant inverter, legs 30, 32 are not identical in switching characteristics. For example, if first leg 30 is configured as a "forward leg" (i.e., first switch 34 switching ON while output current is being supplied to output terminals 50, 52) on the first part of a switching cycle, diode 36 initially conducts, then the conduction passes to the first switch. In this situation second leg 32 is a "backward leg," fourth switch 46 switching ON while no output current is being supplied to output terminals 50, 52. Consequently, fourth diode 48 does not conduct. Consequently the forward leg experiences greater switching losses than the backward leg, causing higher operating temperatures in the components of the forward leg, which in turn decreases the performance of the forward leg. In addition, the greater losses in the forward leg may decrease the service life of the components in that leg.

The present invention overcomes the inherent imbalance between the forward and backward legs of quasi-resonant inverters by selectably reversing or swapping the operation of first and second legs 30, 32 as forward and backward legs. With reference to FIGS. 1 and 2, control 22 is configured to selectably establish one of first and second legs 30, 32 respectively as the forward leg, the other leg being configured as the backward leg. Control 22 may subsequently reverse or swap this configuration, re-establishing the leg operating as the forward leg to operate as the backward leg, while the leg operating as the backward leg is re-established to operate as the forward leg. This selectable leg reversal may be accomplished in a number of ways, as discussed in detail below.

Figure 3:
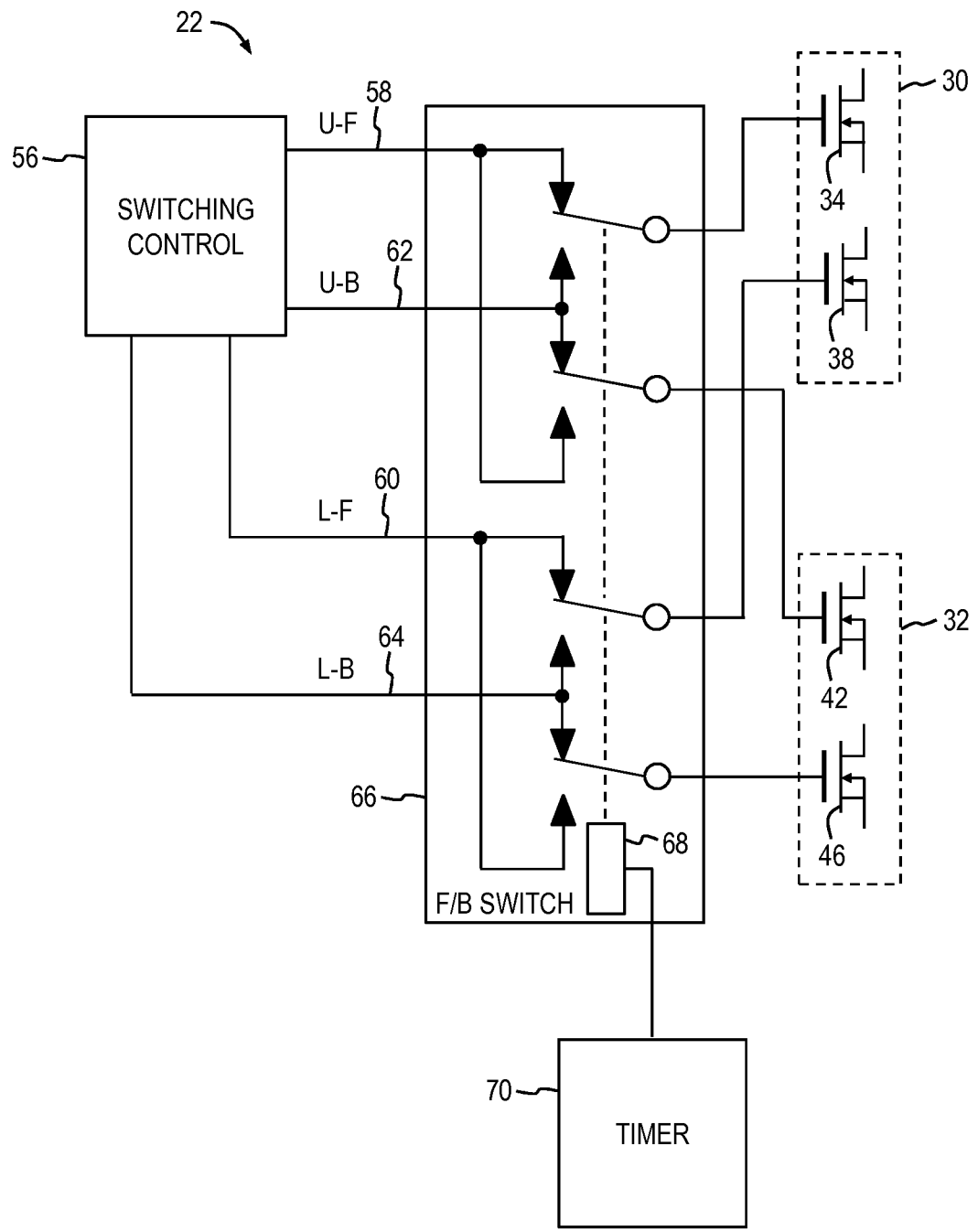
FIG. 3 is a schematic diagram of an inverter control having a timer control element according to an embodiment of the present invention.

In one embodiment of the present invention, reversal of first and second legs 30, 32 may be effected after a predetermined period of operating time of inverter 10 has elapsed. A relevant portion of control 22 is shown in FIG. 3, wherein a switching control 56 generates appropriately-timed drive signals to switches 34, 38, 42, 46 operating as a quasi-resonant inverter. A first drive signal 58 (U-F) provides forward-leg signals for either of upper switches 34, 42, while a second drive signal 60 (L-F) provides forward-leg signals for either of lower switches 38, 46. Likewise, a third drive signal 62 (U-B) provides backward-leg signals for either of upper switches 34, 42, while a fourth drive signal 64 (L-B) provides backward-leg signals for either of lower switches 38, 46.

A forward/backward (F/B) switch 66 receives drive signals 58 through 64 and routes them appropriately such that, in a first operating mode of the F/B switch, switches 34, 38 of first leg 30 function as a forward leg while switches 42, 46 of second leg 32 function as a backward leg. For the purpose of illustration, F/B switch 66 is shown in FIG. 3 as a 4-pole, double throw relay having a coil 68. When coil 68 is unenergized as shown in FIG. 3, first leg 30 functions as a forward leg while second leg 32 functions as a backward leg. Conversely, when coil 68 is energized, first leg 30 functions as a backward leg while second leg 32 functions as a forward leg. A timer 70 controls the on-off operation of coil 68, thereby selectably controlling the amount of time legs 30, 32 each function as forward and backward legs.

Figure 4:
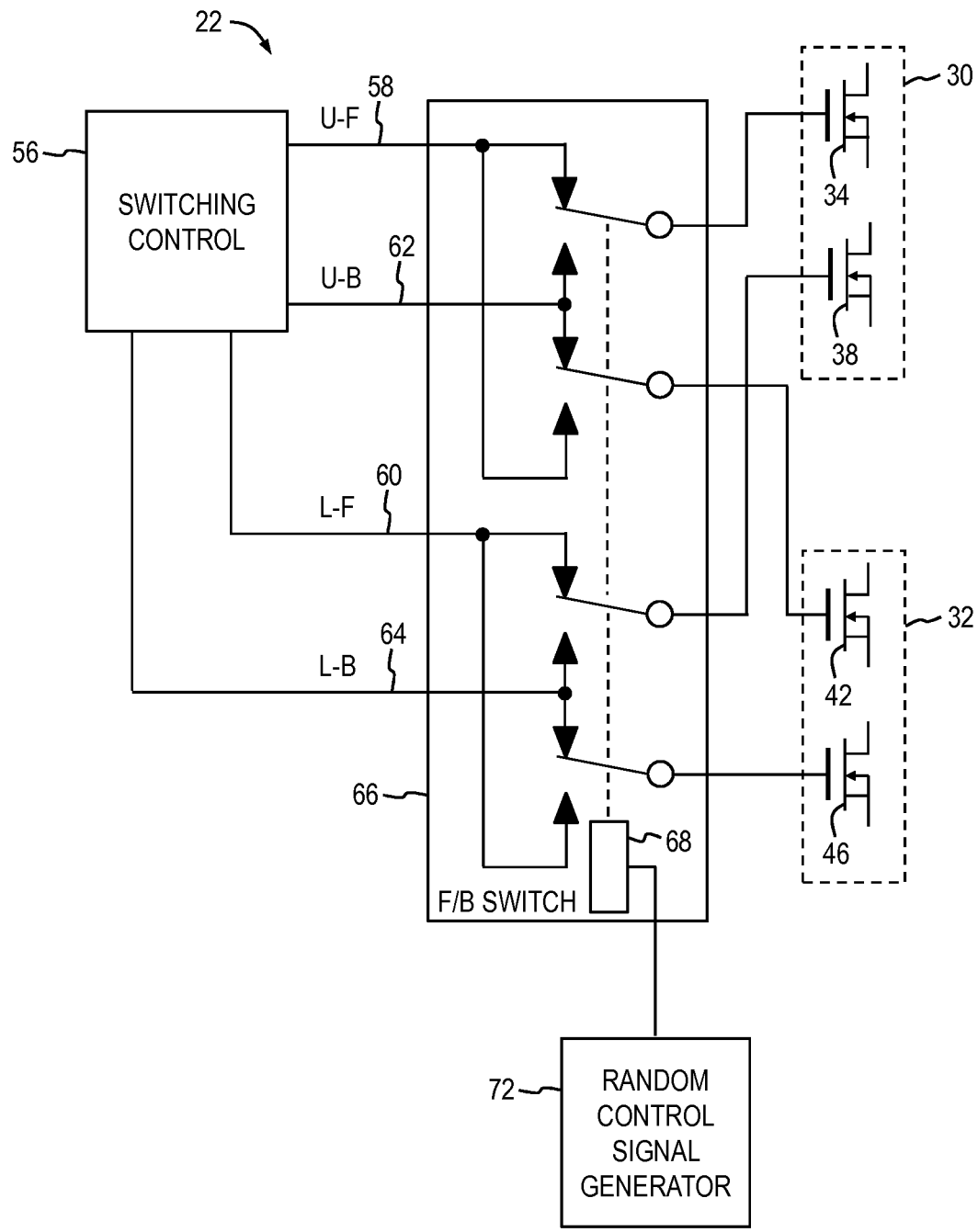
FIG. 4 is a schematic diagram of an inverter control having a random control signal generator according to an embodiment of the present invention.

Alternatively, the reversal of first and second legs 30, 32 respectively may be accomplished randomly. With reference to FIG. 4, a random control signal generator 72 controls the on-off operation of coil 68, thereby randomly controlling the amount of time legs 30, 32 each function as forward and backward legs. FIG. 4 is otherwise similar to FIG. 3.

Figure 5:
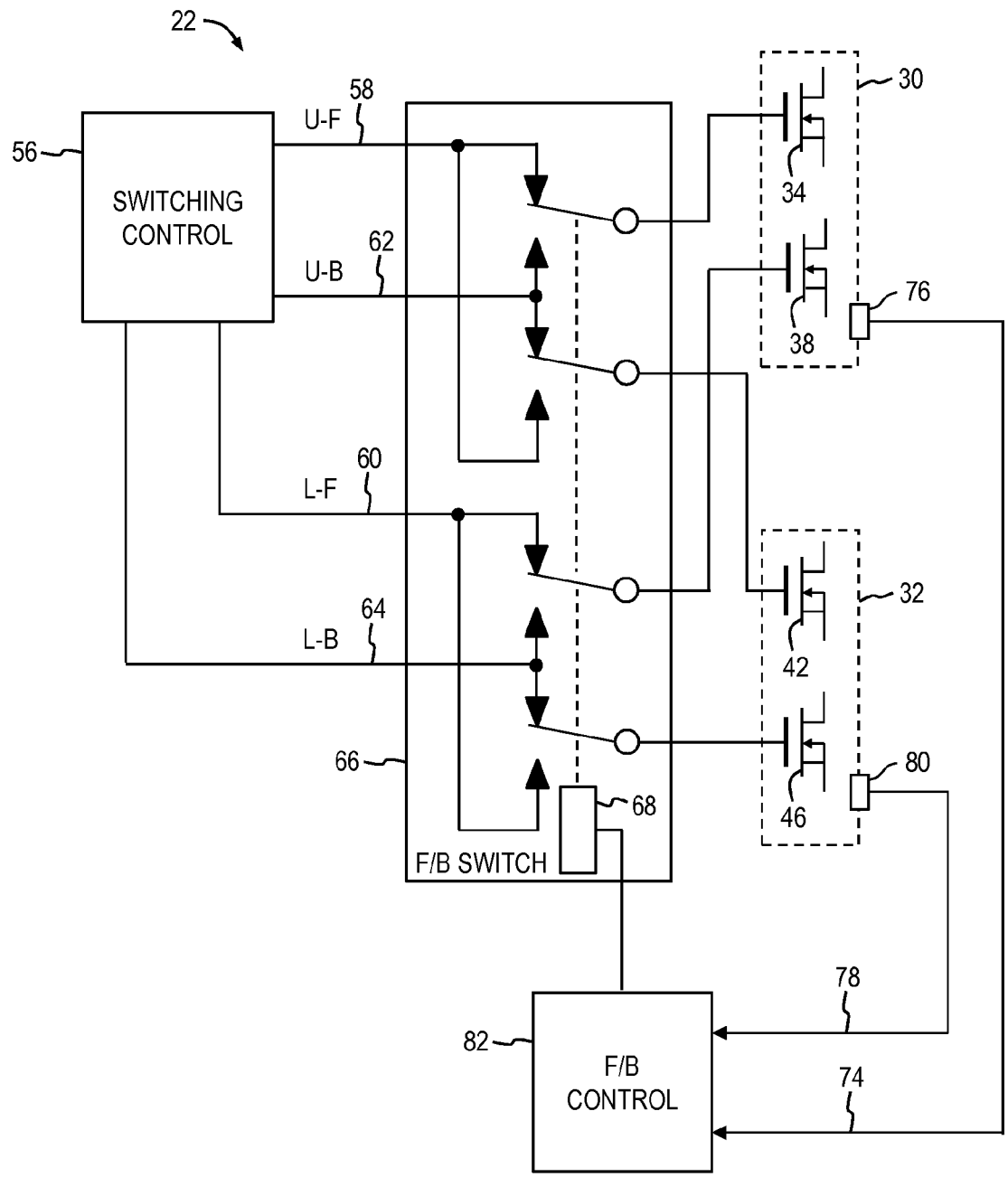
FIG. 5 is a schematic diagram of an inverter control having temperature control elements according to an embodiment of the present invention.

With reference to FIG. 5, in yet another embodiment the reversal of first and second legs 30, 32 respectively may be accomplished in response to monitored conditions, such as control 22 monitoring the temperature of at least some of the components in legs 30, 32. For example, the value of a first temperature electrical signal 74 from a first temperature monitor 76 (such as a thermocouple or solid-state sensor) may relate to the temperature of one or more components of first leg 30, while the value of a second temperature electrical signal 78 from a second temperature monitor 80 (such as a thermocouple or solid-state sensor) may relate to the temperature of one or more components of second leg 32. A forward/backward (F/B) control 82 monitors the temperature of at least some of the components of first and second legs 30, 32 respectively by monitoring signals 74 and 78, and effects a reversal of the first and second legs in accordance with predetermined criteria, such as when one of the first and second legs 30, 32 respectively reaches a predetermined temperature and/or when a predetermined temperature differential exists between the first and second legs. FIG. 5 is otherwise similar to FIG. 3.

It should be emphasized that F/B switch 66 is shown in FIGS. 3 through 5 merely to illustrate various embodiments of the present invention. One skilled in the art will appreciate that the function of F/B switch 66 may be realized utilizing solid-state components rather than electro-mechanical relays. Furthermore, F/B switch 66 may be integrated with switching control 56.

With reference now to FIGS. 1 through 5 together, in one embodiment of the present invention control 22 may include a central processing unit (CPU) comprising microprocessor microcontroller, computer or other similar device. Control 22 may further utilize or include a set of predetermined instructions or "software" 54 establishing operating parameters for system 10, including, but not limited to, reversing the forward and backward legs 30, 32, pulse width modulation (PWM) control, voltage control, current control, fault monitoring and fault alerting. Furthermore, switching control 56 may be configured with a computing device, such as a microprocessor or a microcontroller, and a predetermined set of instructions such as software, such that drive signals 58 through 64 are directly generated as forward- or backward-leg signals and are selectably alternated between the forward- and backward-leg modes in accordance with the instructions of the software. Additional functions, such as timer 70, random control signal generator 72, and F/B control 82 may be integrated into the computing device.

Figure 6:
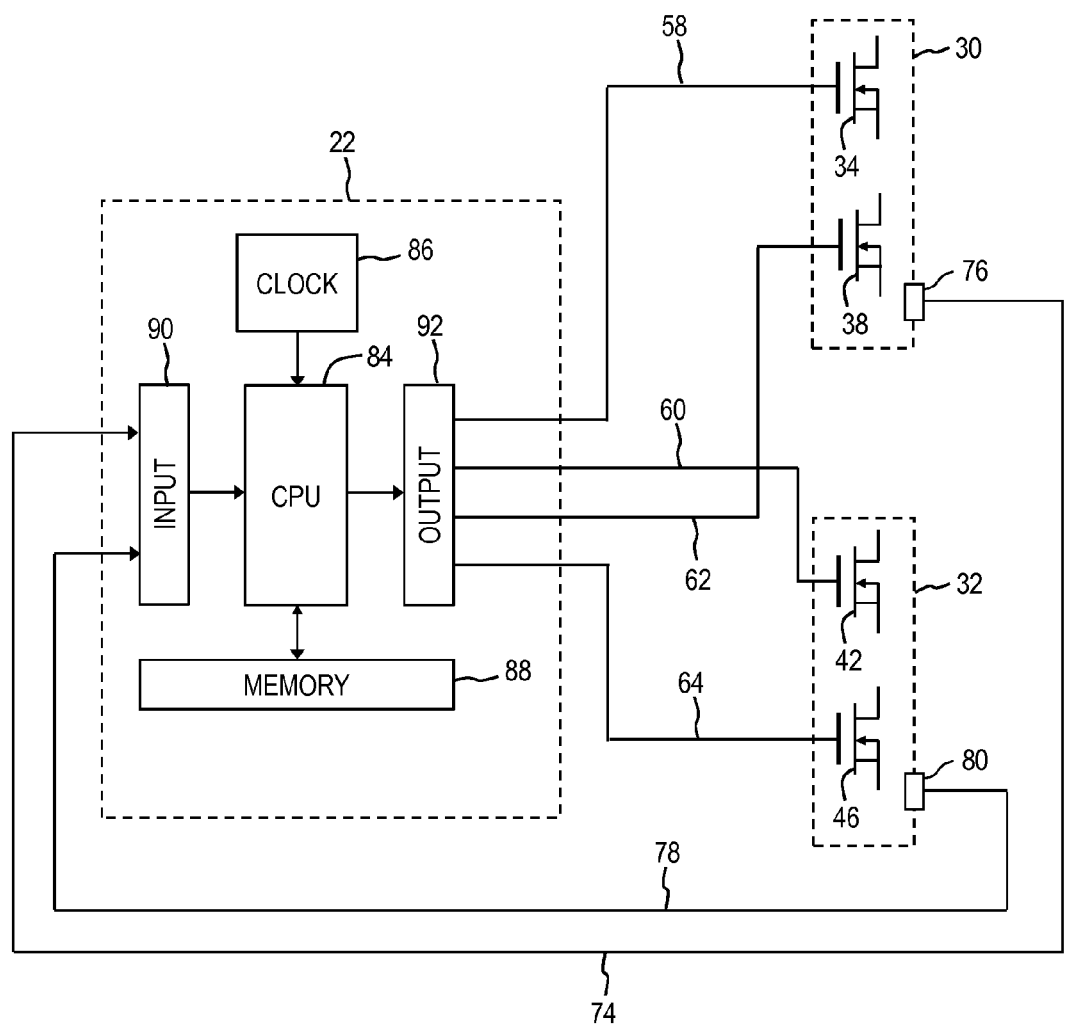
FIG. 6 is a schematic diagram of a computer processing unit-based inverter control according to an embodiment of the present invention.

An example of a relevant portion of a CPU-based control 22 is shown in FIG. 6 according to an embodiment of the present invention. In this embodiment a CPU 84 receives a timing input from a clock 86. A memory 88, such as a read-only memory or a random-access memory, stores a predetermined set of instructions, such as a computer program, that configure the operating characteristics of control 22 and inverter system 10. An input 90 receives input signals, such as temperature signals 74, 78, conditions the input signals as needed, and provides them to CPU 84. An output 92 provides output signals, such as drive signals 58, 60, 62, 64 for switches 34, 42, 38 and 46 respectively.

In operation of the system of FIG. 6, clock 86 may function in place of timer 70 of FIG. 3. In this configuration the instructions in memory 88 will count a predetermined number of clock 86 cycles, periodically switching legs 30, 32 between forward and backward operating modes. Similarly, CPU 84 may include a random number generator that may be used in conjunction with the instructions in memory 88 to randomly switch legs 30, 32 between forward and backward operating modes in a manner similar to the embodiment of FIG. 4. Alternatively, the instructions in memory 88 may be configured to cause CPU 84 to randomly reverse or swap legs 30, 32 between forward and backward operating modes without the use of a random number generator. Lastly, CPU 84 may monitor temperature signals 74, 78 via input 90 and switch legs 30, 32 between forward and backward operating modes in response to the measured temperatures of the legs 30, 32 in the manner described above for F/B control 82.

It should be noted that the control 22 of FIG. 6 lacks the F/B switch 66 of FIGS. 3 through 5. Instead, CPU 84, operating as described above, further generates drive signals 58, 60, 62, 64, the drive signals having the appropriate timing, pulse width, voltage and other characteristics for proper operation of switching assembly 28 in inverter 10. In a first mode, drive signals 58, 62 are configured to drive switches 34, 38 of first leg 30 as a forward leg, and drive signals 60, 64 are configured to drive switches 42, 46 of second leg 32 as a backward leg. Conversely, in a second mode, drive signals 58, 62 are configured to drive switches 34, 38 of first leg 30 as a backward leg, and drive signals 60, 64 are configured to drive switches 42, 46 of second leg 32 as a forward leg. Switching between the first and second mode, as well as the characteristics of the drive signals 58, 60, 62, 64 is controlled by CPU 84 operating in accordance with the instructions in memory 88.

While this invention has been shown and described with respect to a detailed embodiment thereof, it will be understood by those skilled in the art that changes in form and detail thereof may be made without departing from the scope of the claims of the invention.

What is claimed is:

1. A power supply control system for a power supply having a first half-bridge leg with a first plurality of switches, a second half-bridge leg with a second plurality of switches, and an output, comprising:
   a first plurality of drive signals configured to operate a select half-bridge leg as a forward leg such that a switch of the select half-bridge leg switches on while output current is being supplied to the output;
   a second plurality of drive signals configured to operate a select half-bridge leg as a backward leg such that a switch of the select half-bridge leg switches on while current is not being supplied to the output; and
   a forward/backward switch element intermediate the first and second plurality of drive signals and the first and the second half-bridge legs, the forward/backward switch element being adapted to operate the first half-bridge as a forward leg and the second half-bridge as a backward leg in a first operating mode, the forward/backward switch element being further adapted to operate the first half-bridge as a backward leg and the second half-bridge as a forward leg in a second operating mode.

2. The power supply control system of claim 1, further including a control element adapted to selectably change the forward/backward switch element from the first operating mode to the second operating mode, and from the second operating mode to the first operating mode.

3. The power supply control system of claim 2 wherein the control element is a timer, the timer selectably changing the forward/backward switch element between the first and second operating modes after a predetermined amount of time has elapsed.

4. The power supply control system of claim 2 wherein the control element is a random control signal generator, the random control signal generator selectably changing the forward/backward switch element between the first and second operating modes after a random amount of time has elapsed.

5. The power supply control system of claim 2, further including:
   at least one temperature monitor adapted to generate at least one temperature signal relating to at least one of the first and the second half-bridge legs; and
   a forward/backward control adapted to receive the at least one temperature signal,
   the forward/backward control selectably changing the forward/backward switch element between the first and second operating modes in response to the at least one temperature signal.

6. The power supply control system of claim 1 wherein the switches of the first half-bridge leg and the second half-bridge leg each comprise a pair of switches.

7. The power supply system of claim 6 wherein the pair of switches include at least one of a bipolar junction transistor (BJT), a metal oxide semiconductor field effect transistor (MOSFET) and an insulated-gate bipolar transistor (IGBT).

8. The power supply control system of claim 6, further including a diode connected in an anti-parallel arrangement with each switch.

9. The power supply control system of claim 1 wherein the first half-bridge leg and the second half-bridge leg convert a direct-current (DC) voltage to an alternating-current (AC) voltage.

10. A power supply control system for a power supply having a first half-bridge leg with a first plurality of switches, a second half-bridge leg with a second plurality of switches, and an output, comprising:
    a central processing unit;
    a memory coupled to the central processing unit, the memory further including a predetermined set of instructions; and
    an output coupled to the central processing unit and adapted to transmit signals generated by the central processing unit,
    the central processing unit generating a first plurality of drive signals in accordance with the predetermined set of instructions to operate the first half-bridge leg, and generating a second plurality of drive signals in accordance with the predetermined set of instructions to operate the second half-bridge leg,
    wherein, in accordance with the predetermined set of instructions, the central processing unit further operates the first half-bridge leg as a forward leg such that a switch of the first half-bridge leg switches on while output current is being supplied to the output and operates the second half-bridge leg as a backward leg such that a switch of the second half-bridge leg switches on while current is not being supplied to the output in a first operating mode, and operates the first half-bridge as a backward leg such that a switch of the first half-bridge leg switches on while output current is not being supplied to the output and operates the second half-bridge leg as a forward leg such that a switch of the second half-bridge leg switches on while current is being supplied to the output in a second operating mode.

11. The power supply control system of claim 10, further including a clock coupled to the central processing unit, the central processing unit utilizing a clock signal from the clock to periodically change operation between the first and the second operating modes in accordance with the predetermined set of instructions.

12. The power supply control system of claim 10, wherein the central processing unit further includes a random number generator, the central processing unit utilizing the random number generator to periodically change operation between the first and the second operating modes in accordance with the predetermined set of instructions.

13. The power supply control system of claim 10, further including:
   a input adapted to receive signals and forward the received signals to the central processing unit; and
   at least one temperature monitor adapted to generate at least one temperature signal relating to at least one of the first and the second half-bridge leg,
   the at least one temperature signal being coupled to the input, the input providing at least one corresponding conditioned temperature signal to the central processing unit,
   the central processing unit utilizing the at least one conditioned temperature signal to change operation between the first and the second operating modes in accordance with the predetermined set of instructions.

14. The power supply control system of claim 10 wherein the switches of the first half-bridge leg and the second half-bridge leg each comprise a pair of switches.

15. The power supply system of claim 14 wherein the pair of switches include at least one of a bipolar junction transistor (BJT), a metal oxide semiconductor field effect transistor (MOSFET) and an insulated-gate bipolar transistor (IGBT).

16. The power supply control system of claim 14, further including a diode connected in an anti-parallel arrangement with each switch.

17. The power supply control system of claim 10 wherein the first half-bridge leg and the second half-bridge leg convert a direct-current (DC) voltage to an alternating-current (AC) voltage.

* * * * *